United States Patent
Jenne et al.

(10) Patent No.: US 11,157,056 B2
(45) Date of Patent: Oct. 26, 2021

(54) SYSTEM AND METHOD FOR MONITORING A MAXIMUM LOAD BASED ON AN AGGREGATE LOAD PROFILE OF A SYSTEM

(71) Applicant: DELL PRODUCTS, LP, Round Rock, TX (US)

(72) Inventors: John Erven Jenne, Austin, TX (US); Kyle E. Cross, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 47 days.

(21) Appl. No.: 16/671,714

(22) Filed: Nov. 1, 2019

(65) Prior Publication Data

US 2021/0132674 A1     May 6, 2021

(51) Int. Cl.
*G06F 1/30*        (2006.01)

(52) U.S. Cl.
CPC ...................... *G06F 1/30* (2013.01)

(58) Field of Classification Search
CPC ............ G06F 1/30; G06F 1/26; G06F 1/3212; G06F 1/3203; Y02D 10/00; Y04S 20/20
See application file for complete search history.

(56) References Cited

U.S. PATENT DOCUMENTS

| | | | | |
|---|---|---|---|---|
| 7,581,125 B2 * | 8/2009 | Ranganathan | ........ | G06F 1/3296 713/320 |
| 8,006,108 B2 * | 8/2011 | Brey | ...................... | G06F 1/3203 713/320 |
| 2007/0049133 A1 * | 3/2007 | Conroy | ................. | G06F 1/3203 439/894 |
| 2007/0260896 A1 * | 11/2007 | Brundridge | ........... | G06F 1/3203 713/300 |
| 2008/0184044 A1 * | 7/2008 | Leech | ........................ | G06F 1/28 713/300 |
| 2008/0184230 A1 * | 7/2008 | Leech | ..................... | G06F 9/505 718/100 |
| 2008/0222435 A1 * | 9/2008 | Bolan | ................... | G06F 1/3203 713/310 |

(Continued)

OTHER PUBLICATIONS

Yang Li et al., A Scalable Priority-Aware Approach to Managing Data Center Server Power, Conference Paper—Feb. 2019, DOI: 10.1109/HPCA.2019.00067, https://www.researchgate.net/publication/331258894, 15 pages.

*Primary Examiner* — Raymond N Phan
(74) *Attorney, Agent, or Firm* — Larson Newman, LLP (57) ABSTRACT

A system includes a power distribution unit and power manager circuitry. The power manager circuitry to receive a first load profile of a first information handling system, a second load profile of a second information handling system, and a third load profile of a third information handling system. The load profiles are based on power telemetry of the associated server. The power manager circuitry creates an aggregate load profile based on the first, second, and third load profiles, and determines whether the aggregate load profile exceeds a maximum load of the power distribution unit. If the aggregate load profile exceeds the maximum load of the power distribution unit, the power manager circuitry provides an optimal set of power recovery delays for a first, second, and third information handling system and also provides a power supply load limit exceeded warning message.

18 Claims, 5 Drawing Sheets

(56) References Cited

U.S. PATENT DOCUMENTS

| | | | |
|---|---|---|---|
| 2012/0054527 A1* | 3/2012 | Pfeifer | G06F 11/203 713/340 |
| 2012/0173862 A1 | 7/2012 | Khatri et al. | |
| 2013/0318371 A1* | 11/2013 | Hormuth | G06F 1/28 713/320 |
| 2014/0277784 A1* | 9/2014 | Mick | H05K 7/20209 700/286 |
| 2016/0203159 A1 | 7/2016 | Tran | |
| 2016/0246349 A1* | 8/2016 | Perry | G06F 9/5094 |
| 2017/0155253 A1* | 6/2017 | Veda | G06F 1/26 |

* cited by examiner

SYSTEM AND METHOD FOR MONITORING A MAXIMUM LOAD BASED ON AN AGGREGATE LOAD PROFILE OF A SYSTEM

FIELD OF THE DISCLOSURE

The present disclosure generally relates to information handling systems, and more particularly relates to a system level power recovery.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements may vary between different applications. Thus information handling systems may also vary regarding what information is handled, how the information is handled, how much information is processed, stored, or communicated, and how quickly and efficiently the information may be processed, stored, or communicated. The variations in information handling systems allow information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, graphics interface systems, data storage systems, networking systems, and mobile communication systems. Information handling systems may also implement various virtualized architectures. Data and voice communications among information handling systems may be via networks that are wired, wireless, or some combination.

SUMMARY

A system includes a power distribution and power manager circuitry. The power manager circuitry to receive a first load profile of a first information handling system, a second load profile of a second information handling system, and a third load profile of a third information handling system. The load profiles may be based on power telemetry of the associated server. The power manager circuitry may create an aggregate load profile based on the first, second, and third load profiles, and determines whether the aggregate load profile exceeds a maximum load of the power distribution unit. If the aggregate load profile exceeds the maximum load of the power distribution unit, the power manager circuitry may provide a power supply load limit exceeded warning message.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
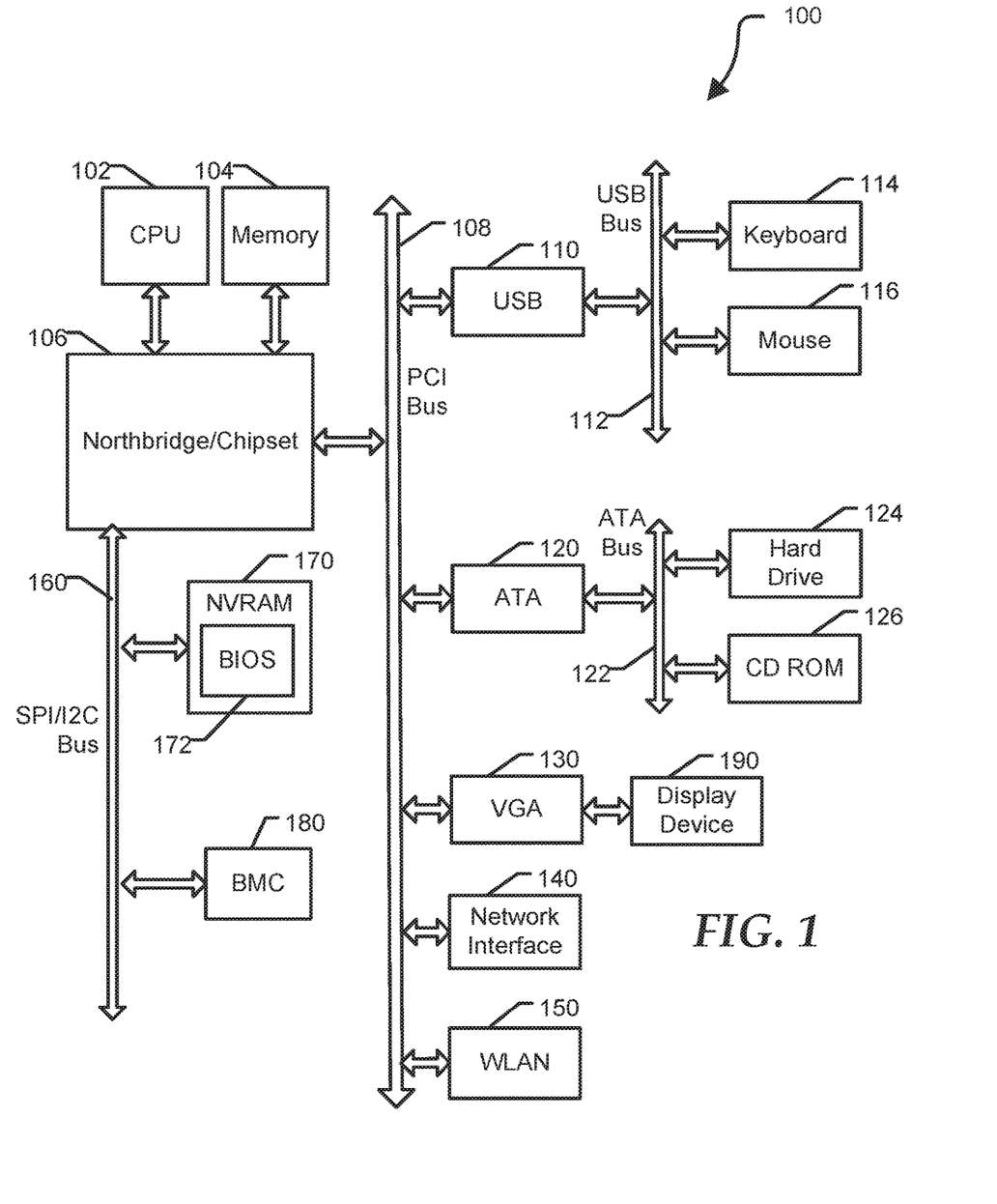
FIG. 1 is a block diagram of a general information handling system according to at least one embodiment of the disclosure.

FIG. 1 illustrates a general information handling system 100 including a processor 102, a memory 104, a northbridge/chipset 106, a PCI bus 108, a universal serial bus (USB) controller 110, a USB bus 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an embodiment, information handling system 100 may be information handling system 200 of FIG. 2 or information handling system 300 of FIG. 3. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional buses, not shown for clarity. For example, system 100 can include multiple processor cores, audio devices, and the like. While a particular arrangement of bus technologies and interconnections is illustrated for the purpose of example, one of ordinary skilled in the art will appreciate that the techniques disclosed herein are applicable to other system architectures. System 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. For example, device controller 130 may provide data to a display device 190 to visually present the information to an individual associated with information handling system 100. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
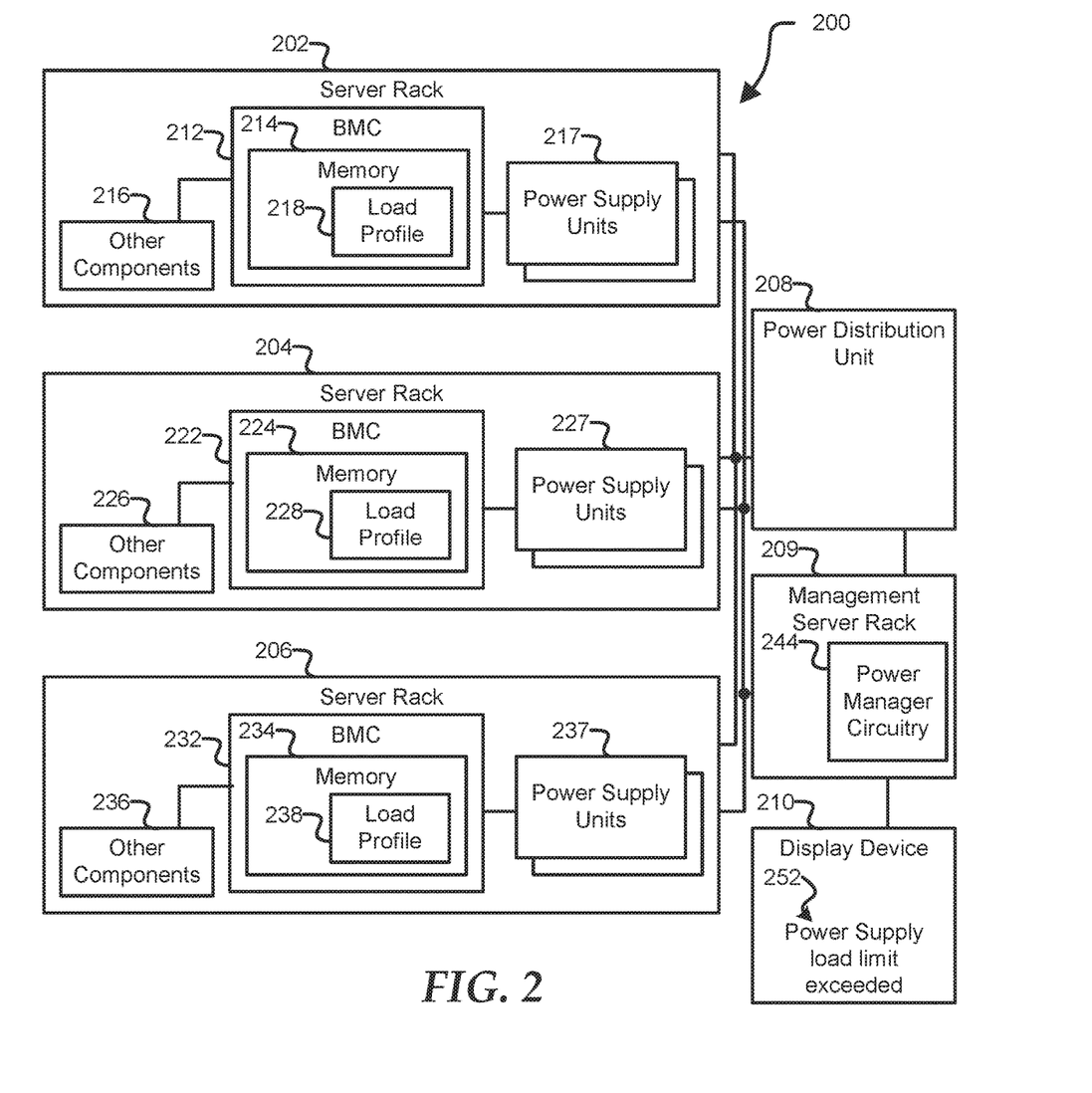
FIG. 2 is a block diagram of a portion of an information handling system for power recovery sensing according to at least one embodiment of the disclosure.

FIG. 2 is a block diagram of a portion of an information handling system 200 for determining whether a power load from a group of server racks, such as server racks 202, 204, and 206, exceeds a load limit of a power distribution unit, such as power distribution unit 208 according to at least one embodiment of the disclosure. Information handling system 200 includes other information handling systems or server racks 202, 204, and 206, power distribution unit 208, a management server 209, and a display device 210. In an example, information handling system 200 may be a data center and each of the server racks 202, 204, and 206 may be linked together along with management server 209, such that the management server may communicate with each of the server racks. Server rack 202 includes any suitable components or devices including, but not limited to, a baseboard management controller (BMC) 212, a memory 214, other components 216, and power supply units 217. In an example, other components 216 may include any suitable components of a server rack, such as one or more servers, and each server may include one or more processors, one or more memory devices, one or more fans, one or more PCIe devices, or the like. Server rack 204 includes any suitable components or devices including, but not limited to, a BMC 222, a memory 224, other components 226, and power supply units 227. In an example, other components 226 may include any suitable components of a server rack, such as one or more servers, and each server may include one or more processors, one or more memory devices, one or more fans, one or more PCIe devices, or the like. Server rack 206 includes any suitable components or devices including, but not limited to, a BMC 232, a memory 234, other components 236, and power supply units 237. In an example, other components 236 may include any suitable components of a server rack, such as one or more servers, and each server may include one or more processors, one or more memory devices, one or more fans, one or more PCIe devices, or the like. Management server 209 includes power manager circuitry 244.

Information handling system 200 may be employed, in whole or in part, by information handling system 100 illustrated in FIG. 1, or any other system, device, component, etc. operable to employ portions, or all of, the information handling system. In certain examples, power distribution unit 208 may include any suitable device or devices to provide power to server racks 202, 204, and 206 within information handling system 200. In an example, information handling system 200 may include more server racks than shown in FIG. 2 without varying from the scope of this disclosure. However, for clarity and brevity the description of information handling system 200 will be described with respect only to server racks 202, 204, and 206.

During a power-on of server racks 202, 204, and 206, such as during a power recovery for the information handling systems, each of the server racks is powered on via power provided by power supply units 217, 227, and 228 based on power from power distribution unit 208. However, if too many of server racks 202, 204, and 206 are powered on at substantially the same time, the power consumption of the server racks may exceed a power supply load limit of power distribution unit 208. In this example, if the amount of power consumed by server racks 202, 204, and 206 is too high power distribution unit 208, circuit breakers, or other components within data center 200 may trip and cut power to the server racks. However, while over-current protection may protect power distribution unit 208, the operation of cutting power will increase an amount of time needed for server racks 202, 204, and 206 to come out of POST and thereby reduce up-time of the server racks. Furthermore, the operation of cutting power may in some circumstances prevent server racks 202, 204, and 206 from ever completing POST and powering on. Therefore, power manager circuitry 244 may improve information handling system 200 by monitoring power consumption of server racks 202, 204, and 206 to warn a user if the power limit of power distribution unit 208 is exceed and to configure power recovery delays for the server racks to minimize power recovery time and increase the up-time of the information handling system. As used herein, the term power recovery delays may refer to alternating current (AC) power recovery delays from power supply units 217, 227, and 237.

During a power-on self test (POST) of servers within server rack 202, BMC 212 may perform one or more operations to create a load profile for the server rack. In an example, the load profile of a server rack, such as server rack 202, may include information associated with an amount of a load the components within server rack may place on power distribution unit 208. For example, the amount of load may be a total amount of power utilized by BMC 212, memory 214, and other components 216, such as servers and/or sleds, within server rack 202. In an example, during the POST of servers within server rack 202, BMC 212 may capture system power telemetry from other components 216, such as servers. The power telemetry may be digital signals from each of other components 216, and the digital signals may indicate an amount of power consumed by each other components. Based on the power telemetry received from other components 216, BMC 212 may create a load profile 218 for server rack 202. BMC 212 may store load profile 218 in a memory, such as memory 214. In an example, the load profile may include a power characterization for other components 216 of server rack 202, and the power characterization may indicate power usage within the server rack.

In an example, the power characterization of other components 216 may be initially set for server rack 202 when the server rack is manufactured in a factory. However, BMC 212 may receive updated power consumption information of other components 216 within server rack 202 during each POST of subsequent power on of the other components, such as servers within the server rack. In certain examples, BMC 212 may also store a power recovery configuration for other components 216 of server rack 202 within memory 214. In an example, the power recovery configuration may include any suitable data to control a power on sequence of other components 216 within server rack 202. For example, the power recovery configuration may include a delay for powering on other components 216 from an original time within the POST to a later portion of the POST.

In an example, BMC 222 may perform substantially similar operations to those described above with respect to BMC 212. In response to these operations being performed, BMC 222 may receive power telemetry for other components 226, create a load profile for other components 226 within server rack 204, and store the load profile along with a power recovery configuration for the server rack in memory 224. In an example, BMC 232 may perform substantially similar operations to those described above with respect to BMC 212. In response to these operations being performed, BMC 232 may receive power telemetry for other components 236, create a load profile for servers within server rack 206, and store the load profile along with a power recovery configuration for servers within the server rack in memory 234.

Subsequently to BMCs 212, 222, and 232 creating load profiles 218, 228, and 238 in the POST sequence, power manager circuitry 244 within management server 209 may perform one or more operations to gather the load profiles and power recovery configurations for server racks 202, 204, and 206. For example, BMCs 212, 222, and 232 may push load profiles 218, 228, and 238 to power manager circuitry 244 or the power manager circuitry may request and pull the load profiles from the BMCs. In an example, power manager circuitry 244 may be any suitable device or component to control power distribution unit 208. For example, power manager circuitry 244 may be an Open Manage Enterprise (OME) power manager executed within a processor within management server 209. In another example, power manager circuitry 244 may be a dedicated hardware circuit, such as a field gate programmable array (FPGA), to perform the operations disclosed herein.

Upon receiving load profiles 218, 228, and 238 and the power recovery configurations, power manager circuitry 244 may perform one or more operations to determine whether the power demands of server racks 202, 204, and 206 exceed a power limit of power distribution unit 208. In an example, power manager circuitry 244 may apply the power recovery configuration, such as a power on delay, for a particular server rack to the load profile for the server rack. For example, the power recovery configuration for server rack 202 may be applied to load profile 218, the power recovery configuration for server rack 204 may be applied to load profile 228, and the power recovery configuration for server rack 206 may be applied to load profile 238.

In response to the power recovery configurations being applied to the load profiles, power manager circuitry 244 may aggregate load profiles 218, 228, and 238 together into a load profile set or aggregated load. In an example, a set of server racks, such as 202, 204, and 206, may be selected by a user of information handling system or data center 200. For example, the set of server racks may include all server racks, such as server racks 202, 204, and 206, connected to and receiving power from power distribution unit 208. In another example, the set of server racks may be automatically determined by power manager circuitry 244 or any other suitable processor within management server 209. In an example, the load profile set may include data representing the amount of power to be drawn by each of server racks 202, 204, and 206 and specific power on delays associated with each of the server racks. For example, the initial power recovery configurations for server racks 202, 204, and 206 when applied to load profiles 218, 228, and 238 may cause all of the server racks to be powered on at substantially the same time.

Upon aggregating the load profiles, such as load profiles 218, 228, and 238, for the set of server racks, power manager circuitry 244 may perform one or more operations to determine whether the aggregated load profile exceeds the maximum load allowed by power distribution unit 208 during the POST of the servers within the server racks. In an example, a user of information handling system 200 may configure power manager circuitry 244 with the maximum load allowed for power distribution unit 208. Thus, power manager circuitry 244 may compare the aggregated load to the maximum load for power distribution unit 208.

If a determination is made that the aggregated load exceeds the maximum load for the power distribution unit 208, power manager circuitry 244 may perform one or more operations to decrease power recovery times of server racks 202, 204, and 206, increase the up-time of the server racks, and thereby improve information handling system or data center 200. In an example, if the aggregate load exceeds the maximum load for power distribution unit 208, power manager circuitry 244 may provide a warning message to a user of information handling system 200. For example, power manager circuitry 244 may provide a power supply load limit exceeded message 252 to display device 210, which in turn may display the message to the user. Furthermore, if the aggregate load exceeds the maximum load for power distribution unit 208, power manager circuitry 244 may determine different delay combinations for power on of server racks 202, 204, and 206. In an example, the delay combinations may set an order to power on server racks 202, 204, and 206. Based on the determining the different delay combinations, power manager circuitry 244 may analyze the different delay combinations to determine an optimal set of power recovery delays. In an example, power manager circuitry 244 may perform the analyzing of the delay combinations in any suitable manner. For example, power manager circuitry 244 may iteratively apply each delay combination and analyze whether a load of the applied delay combination exceeds the maximum load limit of power distribution unit 208.

In response to power manager circuitry 244 analyzing each of the different delay combinations, the power manager circuitry may determine whether a load of more than one of the delay combinations is less than or equal to the maximum load limit of power distribution unit 208. If the load of more than one of the delay combinations is less than or equal to the maximum load limit, power manager circuitry 244 may determine an optimal delay combination out of the multiple delay combinations with a load less than the maximum load limit of power distribution unit 208. In an example, an optimal delay combination may be a delay combination that keeps the load of server racks 202, 204, and 206 below the maximum load of power distribution unit 208, circuit breakers, or uninterruptible power supplies within information handling system 200, and minimizes power recovery time for the server racks. In certain examples, minimizing power recovery time of server racks 202, 204, and 206 may enable a fast power-up of the server racks while not exceeding the maximum load limit of power distribution unit 208. In an example, the optimal delay configuration may include a specific and possible different delay for each of the servers within server racks 202, 204, and 206 to power up during a POST.

In response to the optimal power delay configuration being selected, power manager circuitry 244 may push the optimal power delay configuration to each of server racks 202, 204, and 206. Thus, BMCs 212, 222, and 232 may receive and store the optimal power delay configuration within associated memory 214, 224, and 234 for use during the next POST of each of the servers within server racks 202, 204, and 206. Upon pushing the optimal power delay configuration to server racks 202, 204, and 206, power manager circuitry 244 may continue to analyze possible power recover delays to determine whether a more optimal set of recovery delays may minimize power recovery time and increase up-time of the server racks and information handling system 200.

In an example, power manager circuitry 244 may receive and store a user selected time frame for the servers within server racks 202, 204, and 206 to power up, store a frequency of power recovery events, and store the optimal set of power recovery delays. Based on this stored data, power manager circuitry 244 may calculate and report to a user the up-times of server racks 202, 204, and 206. In an example, a user may model manual changes in the power recovery delay for server racks 202, 204, and 206. In this example, power manager circuitry 244 may create a chart comparing the aggregate load of server racks 202, 204, and 206 and the maximum load limit of power distribution unit 208. Upon the chart being created, power manager circuitry 244 may provide the chart to the user via display device 210, and the chart may enable the user to visualize the power on problems within information handling system 200.

In an example, power manager circuitry 244 may receive information associated with an in-rush current of each of server racks 202, 204, and 206. In this example, power manager circuitry 244 may read a maximum input current for each server rack 202, 204, and 206. Based on the maximum input current for each server rack 202, 204, and 206, power manager circuitry 244 may calculate a total in-rush current for the set of server racks that receive power from power distribution unit 208.

In an example, power manager circuitry 244 may perform one or more operations based on the calculated total in-rush current for server racks 202, 204, and 206. For example, power manager circuitry 244 may utilize any suitable circuitry or components to control the server rack or server racks that are provided with current at any particular point in time. In an example, power distribution unit 208 may be an intelligent power distribution unit, such that the power distribution unit includes particular components that may control individual power ports of the power distribution unit.

In this example, the individual power ports may be mapped to power manager circuitry 244, such that the power manager circuitry may turn on selected power ports to limit amount of in-rush current drawn by server racks 202, 204, and 206 from power distribution unit 208.

In an example, power manager circuitry 244 may also provide server racks 202, 204, and 206 with POST power controls for respective servers in addition to the optimal power delay configuration. In this example, the load profile may include a marker within POST to indicate when power controls are available during the POST. The power control may include a boot-time only power cap, such that the power controls may not be applied during run-time. In an example, the power controls may be utilized and implemented along with the power recovery delays disclosed above. In this example, an impact of the power controls on POST time may be compared with POST time as a result of power recovery delays. In an example, a determination may be made whether power recovery delays are more time efficient within the POST as compared to power controls based on how significant of power throttling is required during the POST. In an example, power manager circuitry 244 may utilize power caps to control power recovery delays and to manage the aggregate load of server racks 202, 204, and 206 instead of using power controls during POST.

In an example, power manager circuitry 244 may additionally receive priority configuration from server racks 202, 204, and 206. For example, the priority configuration information may indicate that servers within a particular server rack 202, 204, or 206 may have a high priority during power recovery but a lower performance priority during run-time. Power manager circuitry 244 may utilize the priority configuration information when calculating the sets of different power recovery delays, such as setting a particular server rack having a highest recovery priority to have either no recovery delay or the shortest recovery delay.

In an example, the operations discussed above with respect to power manager circuitry 244 within management server 209 may be implemented within a system management console, such as a client personal computer in communication with each of server racks 202, 204, and 206.

Figure 3:
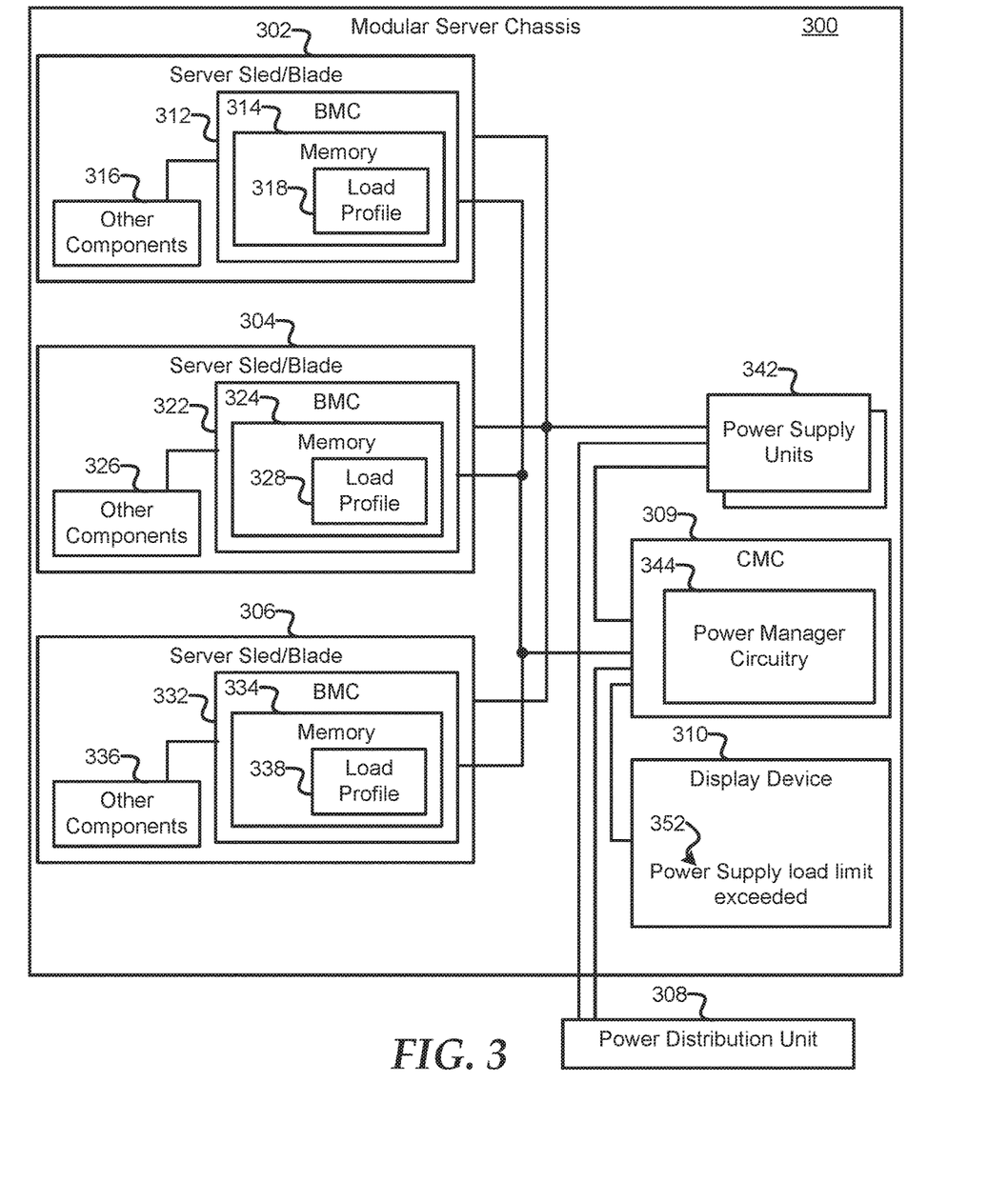
FIG. 3 is a block diagram of a portion of another information handling system for power recovery sensing according to at least one embodiment of the disclosure.

FIG. 3 is a block diagram of a portion of an information handling system or modular server chassis 300 for determining whether a power load from a group of other servers, such as servers 302, 304, and 306, exceeds a load limit of power supply units 242 according to at least one embodiment of the disclosure. Information handling system 300 includes additional information handling systems or servers 302, 304, and 306, power distribution unit 308, a chassis management controller (CMC) 309, and a display device 310. In an example, information handling system 300 may be a modular chassis system. Server 302 includes any suitable components or devices including, but not limited to, a baseboard management controller (BMC) 312, a memory 314, and other components 316. In an example, other components 316 may include any suitable components of a server, such as one or more processors, one or more memory devices, one or more fans, one or more PCIe devices, or the like. Server 304 includes any suitable components or devices including, but not limited to, a BMC 322, a memory 324, and other components 326. In an example, other components 326 may include any suitable components of a server, such as one or more processors, one or more memory devices, one or more fans, one or more PCIe devices, or the like. Server 306 includes any suitable components or devices including, but not limited to, a BMC 332, a memory 334, and other components 336. In an example, other components 336 may include any suitable components of a server, such as one or more processors, one or more memory devices, one or more fans, one or more PCIe devices, or the like. CMC 309 includes power manager circuitry 344.

Information handling system 300 may be employed, in whole or in part, by information handling system 100 illustrated in FIG. 1, or any other system, device, component, etc. operable to employ portions, or all of, the information handling system. In an example, BMCs 312, 322, and 332 may be any suitable type of controllers, such as BMCs in accordance with an IPMI specification, Integrated Dell Remote Access Controllers (iDRACs), or the like. In certain examples, power distribution unit 308 may include any suitable device or devices to provide power to servers 302, 304, and 306 within information handling system 300 including, but not limited to, a hot swap controller. In an example, information handling system 300 may include more servers than shown in FIG. 3 without varying from the scope of this disclosure. However, for clarity and brevity the description of information handling system 300 will be described with respect only to servers 302, 304, and 306.

During a power-on of information handling system 300, such as during a power recovery for the information handling system, servers 302, 304, and 306 are powered on via power provided by power distribution unit 308. However, if too many of servers 302, 304, and 306 are powered on at substantially the same time, the power consumption of the servers may exceed a power supply load limit of power supply units 342. In this example, PCU 308 may include circuitry to detect if the power consumption of servers 302, 304, and 306 is exceeding the limit of power supply units 342, and trigger an over-current protection to cut power to the servers. However, while over-current protection may protect power supply units 342, the operation of cutting power will increase an amount of time needed for servers 302, 304, and 306 to come out of POST and thereby reduce up-time of the servers. Furthermore, the operation of cutting power may in some circumstances prevent server racks 302, 304, and 306 from ever completing POST and powering on. Therefore, power manager circuitry 344 may improve information handling system 300 by monitoring power consumption of servers 302, 304, and 306 to warn a user if the power limit of power supply units 342 is exceed and to configure power recovery delays for the servers to minimize power recovery time and increase the up-time of the information handling system. As used herein, the term power recovery delays may refer AC power recovery delays from power supply units 342.

During a POST of server 302, BMC 312 may perform one or more operations to create a load profile for the server. In an example, the load profile of a server, such as server 302, may include information associated with an amount of a load the server may place on power supply units 342. For example, the amount of load may be a total amount of power utilized by BMC 312, memory 314, and other components 316 within server 302. In an example, during the POST, BMC 312 may capture system power telemetry from other components 316. The power telemetry may be digital signals from each of other components 316, and the digital signals may indicate an amount of power consumed by each other components. Based on the power telemetry received from other components 316, BMC 312 may create a load profile 318 for server 302. BMC 312 may store load profile 318 in a memory, such as memory 314. In an example, the load profile may include a power characterization for other components 316 of server 302, and the power characterization may indicate power usage within the server.

In an example, the power characterization of other components 316 may be initially set for server 302 when the server is manufactured in a factory. However, BMC 312 may re-characterize the power consumption of other components 316 within server 302 during each POST of subsequent power on of the server. In certain examples, BMC 312 may also store a power recovery configuration for server 302 within memory 314. In an example, the power recovery configuration may include any suitable data to control a power on sequence of server 302. For example, the power recovery configuration may include a delay for powering on other components 316 from an original time within the POST to a later portion of the POST.

In an example, BMC 322 may perform substantially similar operations to those described above with respect to BMC 312. In response to these operations being performed, BMC 322 may receive power telemetry for other components 326, create a load profile for server 304, and store the load profile along with a power recovery configuration for the server in memory 324. In an example, BMC 332 may perform substantially similar operations to those described above with respect to BMC 312. In response to these operations being performed, BMC 332 may receive power telemetry for other components 336, create a load profile for server 306, and store the load profile along with a power recovery configuration for the server in memory 334.

Subsequently to BMCs 312, 322, and 332 creating load profiles 318, 328, and 338 in the POST sequence, power manager circuitry 344 may perform one or more operations to gather the load profiles and power recovery configurations for servers 302, 304, and 306. For example, BMCs 312, 322, and 332 may push load profiles 318, 328, and 338 to power manager circuitry 344 or the power manager circuitry may request and pull the load profiles from the BMCs. In an example, power manager circuitry 344 may be any suitable device or component to control power supply units 342. For example, power manager circuitry 344 may be an OME power manager executed within a processor of CMC 309. In another example, power manager circuitry 344 may be a dedicated hardware circuit, such as a FPGA, to perform the operations disclosed herein.

Upon receiving load profiles 318, 328, and 338 and the power recovery configurations, power manager circuitry 344 may perform one or more operations to determine whether the power demands of servers 302, 304, and 306 exceed a power limit of power supply units 342. In an example, power manager circuitry 344 may apply the power recovery configuration, such as a power on delay, for a particular server to the load profile for the server. For example, the power recovery configuration for server 302 may be applied to load profile 318, the power recovery configuration for server 304 may be applied to load profile 328, and the power recovery configuration for server 306 may be applied to load profile 338.

In response to the power recovery configurations being applied to the load profiles, power manager circuitry 344 may aggregate load profiles 318, 328, and 338 together into a load profile set or aggregated load. In an example, a set of servers, such as 302, 304, and 306, may be selected by a user of information handling system 300. For example, the set of servers may include all servers, such as servers 302, 304, and 306, connected to and receiving power from power supply units 342. In another example, the set of servers may be automatically determined by power manager circuitry 344 or any other suitable processor within power distribution unit 308. In an example, the load profile set may include data representing the amount of power to be drawn by each of servers 302, 304, and 306 and specific power on delays associated with each of the servers. For example, the initial power recovery configurations for servers 302, 304, and 306 when applied to load profiles 318, 328, and 338 may cause all of the servers to be powered on at substantially the same time.

Upon aggregating the load profiles, such as load profiles 318, 328, and 338, for the set of servers, power manager circuitry 344 may perform one or more operations to determine whether the aggregated load profile exceeds the maximum load allowed by power supply units 342 during the POST. In an example, a user of information handling system 300 may configure power manager circuitry 344 with the maximum load allowed for power supply units 342 during the POST. Thus, power manager circuitry 344 may compare the aggregated load to the maximum load for the power supply units 342.

If a determination is made that the aggregated load exceeds the maximum load for the power supply units 342, power manager circuitry 344 may perform one or more operations to decrease power recovery times of servers 302, 304, and 306, increase the up-time of the servers, and thereby improve information handling system 300. In an example, if the aggregate load exceeds the maximum load for power supply unit 342, power manager circuitry 344 may provide a warning message to a user of information handling system 300. For example, power manager circuitry 344 may provide a power supply load limit exceeded message 352 to display device 310, which in turn may display the message to the user. Furthermore, if the aggregate load exceeds the maximum load for power supply unit 342, power manager circuitry 344 may determine different delay combinations for power on of servers 302, 304, and 306. In an example, the delay combinations may set an order to power on servers 302, 304, and 306. Based on the determining the different delay combinations, power manager circuitry 344 may analyze the different delay combinations to determine an optimal set of power recovery delays. In an example, power manager circuitry 344 may perform the analyzing of the delay combinations in any suitable manner. For example, power manager circuitry 344 may iteratively apply each delay combination and analyze whether a load of the applied delay combination exceeds the maximum load limit of power supply units 342.

In response to power manager circuitry 344 analyzing each of the different delay combinations, the power manager circuitry may determine whether a load of more than one of the delay combinations is less than or equal to the maximum load limit of power supply units 342. If the load of more than one of the delay combinations is less than or equal to the maximum load limit, power manager circuitry 344 may determine an optimal delay combination out of the multiple delay combinations with a load less than the maximum load limit of power supply units 342. In an example, an optimal delay combination may be a delay combination that keeps the load of servers 302, 304, and 306 below the maximum load of power supply units 342, and minimizes power recovery time for the servers. In certain examples, minimizing power recovery time of servers 302, 304, and 306 may enable a fast power-up of the servers while not exceeding the maximum load limit of power supplies 342. In an example, the optimal delay configuration may include a specific and possible different delay for each of servers 302, 304, and 306 to power up during a POST.

In response to the optimal power delay configuration being selected, power manager circuitry 344 may push the optimal power delay configuration to each of servers 302, 304, and 306. Thus, BMCs 312, 322, and 332 may receive and store the optimal power delay configuration within associated memory 314, 324, and 334 for use during the next POST of information handling system 300. Upon pushing the optimal power delay configuration to servers 302, 304, and 306, power manager circuitry 344 may continue to analyze possible power recover delays to determine whether a more optimal set of recovery delays may minimize power recovery time and increase up-time of the servers and information handling system 300.

In an example, power manager circuitry 344 may receive and store a user selected time frame for servers 302, 304, and 306 to power up, store a frequency of power recovery events, and store the optimal set of power recovery delays. Based on this stored data, power manager circuitry may calculate and report to a user up-times of servers 302, 304, and 306. In an example, a user may model manual changes in the power recovery delay for servers 302, 304, and 306. In this example, power manager circuitry 344 may create a chart comparing the aggregate load of servers 302, 304, and 306 and the maximum load limit of power supply units 342. Upon the chart being created, power manager circuitry 344 may provide the chart to the user via display device 310, and the chart may enable the user to visualize the power on problems within information handling system 300.

In an example, power manager circuitry 344 may receive information associated with an in-rush current of each of servers 302, 304, and 306. In this example, power manager circuitry 344 may read a maximum input current for each server 302, 304, and 306. Based on the maximum input current for each server 302, 304, and 306, power manager circuitry 344 may calculate a total in-rush current for the set of servers that receive power from power supply units 342.

In an example, power manager circuitry 344 may perform one or more operations based on the calculated total in-rush current for servers 302, 304, and 306. For example, power manager circuitry 344 may utilize any suitable circuitry or components to control the server or servers that are provided with current at any particular point in time. In an example, power distribution unit 308 may be an intelligent power distribution unit, such that the power distribution unit includes particular components that may control individual power ports of the power distribution unit. In this example, the individual power ports may be mapped to power manager circuitry 344, such that the power manager circuitry may turn on selected power ports to limit amount of in-rush current drawn by servers 302, 304, and 306 from power supply units 342.

In an example, power manager circuitry 344 may also provide servers 302, 304, and 306 with POST power controls in addition to the optimal power delay configuration. In this example, the load profile may include a marker within POST to indicate when power controls are available during the POST. The power control may include a boot-time only power cap, such that the power controls may not be applied during run-time. In an example, the power controls may be utilized and implemented along with the power recovery delays disclosed above. In this example, an impact of the power controls on POST time may be compared with POST time as a result of power recovery delays. In an example, a determination may be made whether power recovery delays are more time efficient within the POST as compared to power controls based on how significant of power throttling is required during the POST. In an example, power manager circuitry 344 may utilize power caps to control power recovery delays and to manage the aggregate load of servers 302, 304, and 306 instead of using power controls during POST.

In an example, power manager circuitry 344 may additionally receive priority configuration from servers 302, 304, and 306. For example, the priority configuration information may indicate that a particular server 302, 304, or 306 may have a high power recovery priority but a lower performance priority during run-time. Power manager circuitry 344 may utilize the priority configuration information when calculating the sets of different power recovery delays, such as setting a particular server having a highest recovery priority to have either no recovery delay or the shortest recovery delay.

Figure 4:
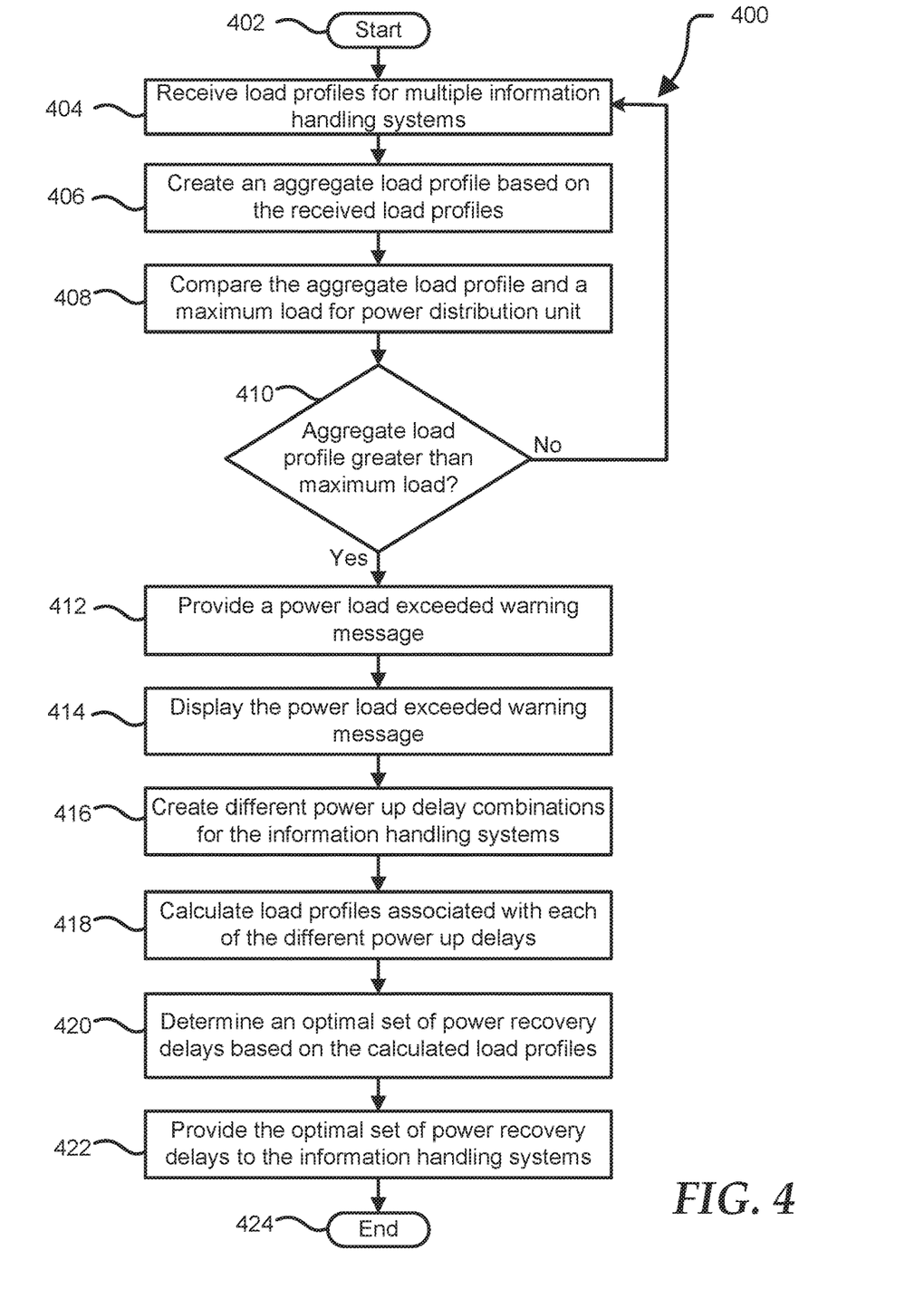
FIG. 4 is a flow diagram illustrating a method for setting power recovery delays for multiple information handling systems in a system according to at least one embodiment of the disclosure.

FIG. 4 shows a method 400 for setting power recovery delays for information handling systems within a system, starting at block 402. In an example, the system may be a data center and the information handling systems may be server racks within the data center. In this example, each of the server racks may include one or more servers. In another example, the system may be a modular chassis system and the information handling systems may be servers or sleds within the modular chassis system. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1, information handling system 200 described in FIG. 2, information handling system 300 described in FIG. 3, or any other type of system, controller, device, module, processor, or any combination thereof, operable to employ all, or portions of, the method of FIG. 4.

At block 404, load profiles for multiple information handling systems are received. In an example, the load profiles may be received at power manager circuitry of the system. In certain examples, the information handling systems providing the load profiles may be any suitable number of information handling systems or server racks within the system or data center. For example, the multiple information handling systems may be only those information handling systems connected to and receiving power from a power distribution unit of the system.

At block 406, an aggregate load profile is created based on the received load profiles. In an example, the aggregate load profile may include data indicating the load of each of the multiple information handling systems and initial power recovery delays for the information handling systems.

At block 408, the aggregate load profile and a maximum load of the power distribution unit are compared. In an example, the maximum load for the power distribution unit may be a total amount of current that the power distribution unit may be able to provide to the information handling systems.

At block 410, a determination is made whether the aggregate load profile exceeds the maximum load of the power distribution unit. In an example, the power manager circuitry of management server or chassis management controller may make this comparison. If the aggregate load profile does not exceed the maximum load of the power distribution unit, the flow continues as stated above at block 404. However, if the aggregate load profile does exceed the maximum load of the power distribution unit, a power load exceeded warning message is provided at block 412. In an example, the power manager circuitry may provide the power load exceeded warning message to a display device of the information handling system.

At block 414, the power load exceeded warning message is displayed to a user of the information handling system. At block 416, different power up delay combinations are created for the information handling systems. In an example, the power manager circuitry may create multiple set of different power up recovery delays. Each set of power recovery delays may include a different power up delay for each information handling system in a set of information handling systems associated with the power distribution unit. At block 418, load profiles associated each of the different sets of delay combination are calculated. In an example, power manager circuitry may utilize the load profiles to determine whether one of more of the sets of power up delays enable the associated load profile to remaining below the maximum load of the power distribution unit.

At block 420, an optimal set of power recovery delays is determined based on the calculated load profiles. In an example, the optimal set of power recovery delays is the set of delays that minimizes power recovery times, increases up-time of the information handling systems, and maintains loads drawn by the information handling systems that are below the maximum load limit of the power distribution unit. At block 422, the optimal set of power recovery delays is provided to each of the information handling systems within the system. In an example, CMCs or BMCs within each of the information handling systems may utilize the power recovery delay associated with that information handling system during a POST of the information handling system. The method ends at block 424.

Figure 5:
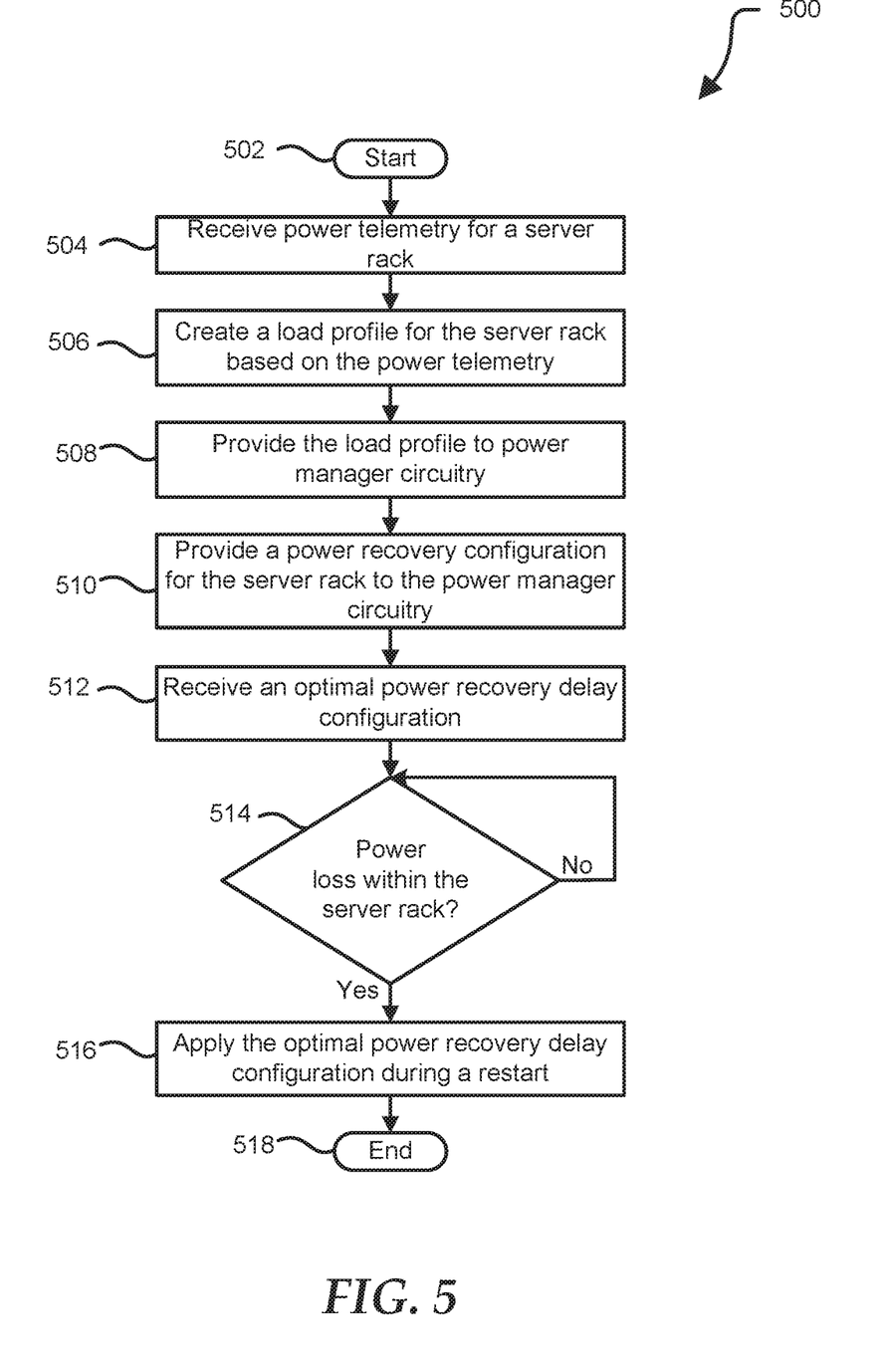
FIG. 5 is a flow diagram illustrating a method for utilizing power recovery delays during a POST of server racks according to at least one embodiment of the disclosure.

FIG. 5 shows a method 500 for utilizing power recovery delays during a POST of a server rack within an information handling system, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by information handling system 100 depicted in FIG. 1, information handling system 200 described in FIG. 2, information handling system 300 described in FIG. 3, or any other type of system, controller, device, module, processor, or any combination thereof, operable to employ all, or portions of, the method of FIG. 5.

At block 504, power telemetry for components within a server rack is received. In an example, the power telemetry may be digital signals received by a BMC of the server rack. At block 506, a load profile for the server rack is created based on the power telemetry. In an example, the load profile may include data representing an amount of a load or current drawn by the components within the server rack.

At block 508, the load profile is provided to power manager circuitry of a management server within a system. At block 510, a power recovery configuration for the server rack is provided to the power manager circuitry. In an example, the power recovery configuration may be an initial power recovery configuration created and stored during manufacturing of the information handling system at a factory, or may be an updated power recovery configuration.

At block 512, an optimal power recovery delay configuration is received. In an example, the optimal power recovery delay configuration may be stored in a memory of the server rack for use during a POST of servers within the server rack. At block 514, a determination is made whether a power loss has been detected within the server rack. In response to the power loss, the optimal power recovery delay configuration is applied during the POST of the servers within the server rack at block 516. In an example, the application of the optimal power recovery delay configuration may control when power is provided to the servers within the server rack, and the optimal power recovery delay configuration ensures that a maximum load of the power supply is not exceeded during the POST. The method ends at block 518.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module may include software, including firmware embedded at a processor or software capable of operating a relevant environment of the information handling system. The device or module may also include a combination of the foregoing examples of hardware or software. Note that an information handling system may include an integrated circuit or a board-level product having portions thereof that may also be any combination of hardware and software.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system, comprising:
a power distribution unit to supply power to a plurality of information handling systems, the power distribution unit includes a respective power port for each of the information handling systems;
power manager circuitry to turn on a subset of the power ports to limit an in-rush current drawn by the information handling systems, to receive a first load profile of a first information handling system, a second load profile of a second information handling system, and a third load profile of a third information handling system, wherein the first load profile is based on first power telemetry of the first information handling system, the second load profile is based on second power telemetry of the second information handling system, and the third load profile is based on third power telemetry of the third information handling system, to create an aggregate load profile based on the first, second, and third load profiles, to compare the aggregate load profile to a maximum load of the power distribution unit, to determine whether the aggregate load profile exceeds the maximum load of the power distribution unit, and in response to the aggregate load profile exceeding the maximum load of the power distribution unit, to provide a power supply load limit exceeded warning message; and
a display device to communicate with the power manager circuitry, the display device to receive the power supply load limit exceeded warning message, and to display the power supply load limit exceeded warning message to a user of the system.

2. The system of claim 1, wherein the first power telemetry includes power requirements for the first information handling system during a power on sequence.

3. The system of claim 1, wherein in response to the aggregate load profile exceeding the maximum load of the power distribution unit, the power manager circuitry further to create different delay combinations for the first, second, and third information handling systems, calculate load profiles associated with each of the different delay combinations, and determine an optimal set of power recovery delays for the first, second, and third information handling systems based on the calculated load profiles and the maximum load of the power distribution unit.

4. The system of claim 1, wherein the power manager circuitry further to detect a set of information handling systems associated with the power delivery unit, wherein the set of information handling systems is selected by a user of the system.

5. The system of claim 1, wherein the maximum load of the power distribution unit is configured based on an input from a user of the system.

6. The system of claim 1, wherein the first, second, and third information handling systems are server racks within a data center.

7. The system of claim 3, wherein a power recovery time for the first, second, and third information handling systems is minimized based on the optimal set of power recovery delays.

8. The system of claim 3, wherein the power manager circuitry further to provide the optimal set of power recovery delays to each of the first, second, and third information handling systems.

9. A method, comprising:
detecting a set of information handling systems associated with a power delivery unit, the set of information handling systems includes first, second, and third information handling systems, wherein the set of information handling systems is selected by a user of the system;
receiving, by power manager circuitry, a first load profile of the first information handling system, a second load profile of the second information handling system, and a third load profile of the third information handling system, wherein the first load profile is based on first power telemetry of the first information handling system, the second load profile is based on second power telemetry of the second information handling system, and the third load profile is based on third power telemetry of the third information handling system;
creating an aggregate load profile based on the first, second, and third load profiles;
comparing the aggregate load profile to a maximum load of the power delivery unit;
determining whether the aggregate load profile exceeds the maximum load of the power distribution unit;
in response to the aggregate load profile exceeding the maximum load of the power distribution unit, providing a power supply load limit exceeded warning message; and
displaying, by a display device, the power supply load limit exceeded warning message to a user of a system.

10. The method of claim 9, in response to the aggregate load profile exceeding the maximum load of the power distribution unit, the method further comprising:
creating, by the power manager circuitry, different delay combinations for the first, second, and third information handling systems,
calculating load profiles associated with each of the different delay combinations; and
determining an optimal set of power recovery delays for the first, second, and third information handling systems based on the calculated load profiles and the maximum load of the power distribution unit.

11. The method of claim 9, wherein the maximum load of the power distribution unit is configured based on an input from a user of the system.

12. The method of claim 9, wherein the first power telemetry includes power requirements for the first information handling system during a power on sequence.

13. The method of claim 10, wherein a power recovery time for the first, second, and third information handling systems is minimized based on the optimal set of power recovery delays.

14. The method of claim 10, wherein the power manager circuitry further to provide the optimal set of power recovery delays to each of the first, second, and third information handling systems.

15. A data center, comprising:
a plurality of information handling systems including first, second and fourth information handling systems, each of the information handling systems including a chassis management controller and a memory, each chassis management controller to capture power telemetry for an associated information handling system, to create a corresponding load profile for the associated server based on the captured power telemetry, and to store the corresponding load profile in the memory including a first load profile for the first information handling system, a second load profile for the second information handling system, and a third load profile for the third information handling system;
a power distribution unit to communicate with the first, second, and third information handling systems, the power distribution unit to supply power to the first, second, and third information handling systems; and
a system management server including power manager circuitry to receive the first load profile, the second load profile, and the third load profile, to create an aggregate load profile based on the first, second, and third load profile, to compare the aggregate load profile to a maximum load of the power distribution unit, to determine whether the aggregate load profile exceeds the maximum load of the power distribution unit, and in response to the aggregate load profile exceeding the maximum load of the power distribution unit, the system management server to:

create different delay combinations for the first, second, and third information handling systems;
calculate load profiles associated with each of the different delay combinations;
determine an optimal set of power recovery delays for the first, second, and third information handling systems based on the calculated load profiles and the maximum load of the power distribution unit; and
provide a power supply load limit exceeded warning message; and
a display device to communicate with the power manager circuitry, the display device to receive the power supply load limit exceeded warning message, and to display the power supply load limit exceeded warning message to a user of the data center.

16. The data center of claim 15, wherein the first power telemetry includes power requirements for the first information handling system during a power on sequence.

17. The data center of claim 15, wherein the power manager circuitry further to provide the optimal set of power recovery delays to each of the first, second, and third information handling systems.

18. The data center of claim 15, wherein the power manager circuitry further to detect a set of information handling systems associated with the power delivery unit, wherein the set of information handling systems is selected by a user of the data center.

* * * * *